Reissued July 28, 1942

Re. 22,147

UNITED STATES PATENT OFFICE 22,147

METHOD OF FORMING BONDED SURFACE LAYERS

Arthur M. Howald and Leonard S. Meyer, Toledo, Ohio, assignors to Plaskon Company, Incorporated, Toledo, Ohio, a corporation of Delaware No Drawing. Original No. 2,178,358, dated October 31, 1939, Serial No. 126,254, February 17, 1937. Application for reissue October 29, 1940, Serial No. 363,368

2 Claims. (Cl. 117—65)

This invention relates to surface layers, and particularly to surface layers for types of composite board that are made of fibrous material impregnated with resinous binders.

Such types of composite board are used for cabinet work and wall paneling and it is desirable that they have good mechanical strength, that they be free of any tendency to warp, and that their surfaces be resistant to the action of moisture, as well as to the action of acids, alkalis, and solvents.

Composite board of adequate strength can be produced by hot pressing fiber impregnated with natural resins or with phenolic resins, and such board is comparatively free of any tendency to warp and is satisfactorily resistant to the action of moisture, solvents, and active chemicals. Because of the yellowish or brownish color of the resins used as binders, however, such board can be made only in dark or yellowish shades, even though white fibrous filler be used. Also, it is liable to discolor under the influence of light.

For some purposes, paneling of light shade or brilliant coloring is highly desirable. Such paneling can be produced by impregnating white or suitably colored sheets of paper with colorless or appropriately colored formaldehyde-urea resin and then hot pressing piles of such sheets. Formaldehyde-urea resin, pure white paper and pigmented paper are all comparatively expensive, however, and the mechanical strength of sheets made of paper impregnated with formaldehyde-urea resin is not as great as that of the best grade of pressed wood sheets or the best grade of sheets made of fiber impregnated with phenolic resins.

Attempts have been made to improve the appearance of board made of fiber impregnated with phenolic resins, by incorporating thereon surface sheets of white or pigmented paper impregnated with formaldehyde-urea resins, but such attempts have not resulted in wholly acceptable products for the reason that the dark phenolic impregnated body is liable to show through the formaldehyde-urea impregnated skin unequally, and give the panels a blotched appearance, and for the further reason that evenly pigmented paper is not readily available.

Panels made by incorporationg surface sheets of formaldehyde-urea impregnated paper with composite board whose principal body is made of fiber impregnated with phenolic or natural resins also have a tendency to warpage. Great care must be used in the manufacture of such board to avoid imperfections resulting from wrinkling or tearing of the surface sheets during pressing operations, and it is practically impossible to make the bond between the surface sheet and the body of the board effective enough to insure against splitting or peeling away of the surface sheet under the influence of changes in atmospheric conditions.

The product of our invention retains the good features of phenolic and natural resin impregnated structures, and imparts to such structures the highly desirable finish and coloring of formaldehyde-urea impregnated materials without causing any tendency to warpage or surface-sheet separation, and achieves these advantages with greater economy of manufacture than is possible when formaldehyde-urea impregnated paper sheets are incorporated with bodies that are impregnated with other resins.

In the first step of the process of our invention, urea is dissolved in formalin, the molecular proportions of formaldehyde to urea preferably being about 1.5 mols of formaldehyde to 1 mol of urea, though other ratios ranging from 1.1:1 to 2:1 may be used. The pH of the solution is adjusted to a standard value near neutrality and the solution is allowed to stand while an addition reaction between the urea and formaldehyde takes place, the temperature of the solution during the standing period being kept below 60° C. to inhibit premature formation of insoluble compounds.

The addition reaction which takes place in the solution results in the formation of methylol ureas, principally monomethylol and dimethylol ureas (the higher the molecular ratio of formaldehyde to urea, the greater the proportion of dimethylol). The time required for the reaction depends upon the temperature at which the solution is maintained. At the end of the reaction the condition of the solution is that of a thin syrup.

Cellulose, preferably in the form of paper or pulp, is then stirred with the solution until thorough and uniform absorption of the solution by the cellulose is attained, the cellulose being shredded either before or during the stirring operation. The acidity of the mass may be increased somewhat for the stirring operation to promote the next stage of reaction, during which the methylol ureas condense with the splitting off of water.

In the process of our invention, the condensation takes place in a drier, in which the wet mass is placed after stirring. The temperature during the drying is progressively increased but is not permitted to exceed 100° C., and the drying is continued until the moisture content of the mass is reduced to less than 10%. Evaporation of water during the drying is facilitated by the spread of the solution over the immense area of the cellulose fibers, and the cellulose, in addition, appears to have a catalytic effect that promotes the elimination of chemically combined water by condensation.

After the drying, the cellulose with its loading of molecularly distributed condensate is placed in a ball mill and ground to a very fine powder. During the grinding, pigments, opacity-increasing materials such as titanium oxide, hot plate lubricants and conditioners such as accelerators or retarders may be added and ground into intimate mixture with the impregnated cellulose particles. The nature and quantity of the pigments and other conditioning materials added will depend upon the type of article with which the material is to be finally incorporated and upon the appearance and surface characteristics that it is desired to produce. Particles of bright metal may be scattered through the mass, to produce scientillating specks in the surface sheet. The amount of cellulose employed can be varied from one-third to twice the amount of resin, but powders containing from 40% to 50% of cellulose have been found to give excellent results.

In the application of the compound to the body for which it is form the surface layer, it is first placed in about three parts of water to one part of powder, and suspension and uniform distribution of the solid particles in the liquid vehicle is attained by stirring or grinding the powder and water together in a ball mill, the temperature of the water being kept low enough so that there is little or no dissolving of the condensate.

The resulting suspension is in the form of a thin batter that is free-flowing and can therefore be readily applied as a surface coating. The impregnation of the cellulose with the formaldehyde-urea condensation product prior to the grinding operation makes the cellulose brittle and causes it to be reduced to a fine powder during the grinding instead of being merely shredded into loose fibers. The thin or free-flowing nature of the aqueous suspension is due to the reduction of the impregnated cellulose to a fine powder during the grinding operation and also to the residual portion of the condensation product carried by the cellulose which does not dissolve in the water. This remaining portion of the condensate overcomes the normal absorbent nature of the cellulose, and prevents the cellulose from producing a solid cake by absorbing the water in which it is placed when a reasonable amount of water is used.

If desired the addition of pigment, instead of being made during the dry grinding, may be deferred until the powder is ground with the water.

Where rapid drying is required, liquid vehicles more volatile than water may be employed. The vehicle should be a liquid in which the condensate is insoluble or only slightly soluble. Examples of such liquids are volatile hydrocarbons, benzene, and methyl and ethyl ethers.

The thin batter which results from grinding the powder and water together is sprayed upon the body for which it is to form the surface layer, after which it is again dried. The dried coating composition may have a rough or even pimply appearance, but because of the small size of the cellulose particles and their complete immersion in the potential resin, they are capable of flowing into a surface coating that is perfectly smooth and flawless.

The final formation and hardening of the surface layer of our invention is caused to take place under heat and pressure. Upon application of a hot plate to the sprayed and dried composition it first softens into a homogeneous mass, flowing into the interstices of the fibrous body to which it is applied and acquiring a surface with the characteristics of the surface of the hot plate that is pressed upon it, and it then hardens by polymerization, becoming infusible, insoluble in ordinary solvents, resistant to the action of light and moisture, and chemically inactive. If the plate by which it is pressed is highly polished, the surface layer of our invention will likewise be highly polished. Any cracks that may have existed in the body to which it is applied will be sealed, and all imperfections will be concealed.

The opacity of the surface layer when pigments or opacifiers are employed is such that the color of the body does not show through it even when a black body is covered by a white or very light-colored coating layer. If no pigments or opacifiers are employed, the finished coating made by use of the batter above described is substantially transparent and can be used as a transparent protective covering for ornamental surfaces, having a high resistance to light and oxidation like the surfaces of articles molded from formaldehyde urea resins. Translucent coatings can be made in accordance with the invention to provide translucent panels when materials are employed for the body portion of the panels that are capable of giving translucent products.

The surface layer of our invention may be hot pressed upon boards or articles which are neither thermoplastic nor thermosetting, or which are so slightly thermoplastic as not to be greatly affected by the heat and pressure employed in forming our surface coating, or our surface coating may be applied to boards or articles of thermoplastic or thermosetting materials, particularly laminated boards, as they are formed under heat and pressure. In such case, the flow properties of the material from which the body of the article is formed and the flow properties of the composition of our surface layer should be such that the heat and pressure required to form the body are approximately the same as that required to form and set our surface layer. Means for adjusting flow properties of thermoplastic and thermosetting compositions are known in the art, and the flow properties and curing time of the composition of our surface layer may be adjusted by varying the proportion of cellulose to resin and by the use of plasticizers, accelerators and retarders such as are employed in conditioning urea-formaldehyde molding compositions.

When the surface coating of our invention is to be applied to laminated board made of layers of paper impregnated with heat hardening resin, sheets of the impregnated paper are sprayed on one side with our water or non-solvent liquid suspension of fine powder. The sprayed sheets are then dried flat, and when the other sheets of impregnated paper are arranged in piles to be pressed into laminated board, one of the sheets upon which our composition has been sprayed and dried is placed at the bottom of the pile with the sprayed surface down and another placed on top of the pile with the sprayed surface up. The pile of sheets is then hot pressed in the same manner as in the usual laminating process, the heat and pressure used depending on the flow properties of the impregnating resin used in the body sheets and the flow properties of our coating composition, and the time during which heat and pressure are applied depending upon the curing properties. It is often desirable in making laminated sheets to cool the pressure plates before relieving the pressure, so that the sheets may be taken from the press stiff and flat.

In pressboard thus made, the bond between the surface layer and the body of the material is superior even to the bond between the body sheets, since the composition employed in the surface layer penetrates into the fibers of the adjacent body material and amalgamates with the body material resin. There is no liability that the surface layer will separate from the body by splitting off or peeling. The cellulose content of the surface layer material not only has a beneficial function during the condensation stage of the reaction, but it also gives to the finished surface coating qualities which prevent it from chipping and crazing as do pure urea-formaldehyde resinous bodies and those containing minerals and other non-cellulosic fillers. The surface layer of our invention possesses the virtues of surface sheets made by impregnating sheets of paper with urea-formaldehyde resin, without their defects and disadvantages, and the surface layer of our invention is much more economical to make and apply.

Where the characteristics of urea-formaldehyde resins are not required, the fibrous particles may be impregnated with other resins such, for example, as phenolic resins. The impregnated fiber may be paper pulp, wood flour or other cellulosic material. In any case it is finely ground and placed in suspension in water or some other volatile liquid that does not remove the resin from the fiber by dissolving it. The powder that is mixed with the water or other liquid, while preferably fine, is by no means of colloidal fineness. In fact it may be as coarse as ordinary granulated sugar, if the batter is stirred frequently to counteract the separating action of gravity, as the particles do not coat in the manner of a paint or varnish but flow under the heat and pressure to which they are subjected and then harden in a manner analogous to the manner in which a molding composition flows and hardens in a heated pressure mold. The process and intermediate and final products are different, however, from processes in which molding compositions are placed in molds with solid inserts and molded about them.

While spraying is a preferred means for applying the surface sheet, it may be applied by other means, such as brushing, or it may be made as a paste instead of a batter and spread by means of a spatula.

The embodiment of our invention herein shown and described is to be regarded as illustrative only, and it is to be understood that the invention is susceptible to variation, modification and change within the spirit and scope of the subjoined claims.

Having described our invention, we claim:

1. A method of preparing and applying a surface coating that comprises impregnating cellulose with a thermosetting formaldehyde-urea reaction product, carrying out condensation of the reaction product on the cellulose, finely grinding the impregnated cellulose and preparing a suspension of the resulting fine particles in water, substantially all of the formaldehyde-urea reaction product in the resulting suspension being derived from the reaction product with which said cellulose was impregnated, applying the suspension as a surface coating, drying, and finishing the coating by hot-pressing.

2. A method of preparing and applying a surface coating that comprises impregnating two parts of cellulose with one to six parts of a thermosetting formaldehyde-urea reaction product, carrying out condensation of the reaction product on the cellulose, finely grinding the impregnated cellulose and preparing a suspension of the resulting fine particles in water, substantially all of the formaldehyde-urea reaction product in the resulting suspension being derived from the reaction product with which said cellulose was impregnated, applying the suspension as a surface coating, drying, and finishing the coating by hot-pressing.

ARTHUR M. HOWALD.
LEONARD S. MEYER.